United States Patent [19]

Griffiths

[11] 4,291,011
[45] Sep. 22, 1981

[54] METHOD FOR PRODUCTION OF ALUMINUM OXIDE

[76] Inventor: Griffiths, Kenneth F., 31 London Ter., New Rochelle, N.Y. 10804

[21] Appl. No.: 187,435

[22] Filed: Sep. 15, 1980

Related U.S. Application Data

[63] Continuation of Ser. No. 963,338, Nov. 24, 1978, abandoned.

[51] Int. Cl.³ .............................................. C01F 7/42
[52] U.S. Cl. ................... 423/625; 422/129; 422/202; 422/232; 423/627
[58] Field of Search ............................... 423/625, 627

[56] References Cited

U.S. PATENT DOCUMENTS

| | | | |
|---|---|---|---|
| 2,693,406 | 11/1954 | Wendell et al. | 423/625 |
| 2,829,949 | 4/1958 | Wendell et al. | 423/625 |
| 3,085,871 | 4/1963 | Griffiths | 75/84.1 |
| 3,085,872 | 4/1963 | Griffiths | 75/84.1 |
| 3,085,873 | 4/1963 | Griffiths | 75/84.1 |
| 3,471,413 | 10/1969 | Hewert | 423/625 |
| 3,848,068 | 11/1974 | Rice | 423/625 |

FOREIGN PATENT DOCUMENTS

| | | | |
|---|---|---|---|
| 47-35679 | 9/1972 | Japan | 423/625 |
| 360980 | 5/1962 | Switzerland | 423/627 |

Primary Examiner—Herbert T. Carter
Attorney, Agent, or Firm—Schiller & Pandiscio

[57] ABSTRACT

High purity aluminum oxide is produced by continuously reacting high purity metallic aluminum, either solid or liquid, with high purity oxygen, present in stoichiometrically excessive amount, within a vertically oriented cylindrical vessel closed at the top and open at the bottom and having cooled side walls on which there forms a layer of solid aluminum oxide. Newly formed aluminum oxide deposits as a liquid film on the inside surface of this layer and flows downwardly thereover by gravity to the open bottom of the container and thence falls to a collecting vessel below, solidifying either during this fall or after impingement on a moving metallic surface. An annular array of burners, e.g. oxyhydrogen burners, limits downward growth of the layer below the vessel, prevents closing off by growth of that layer of the space within the vessel, and fosters detachment of the downwardly flowing film in the form of drops to fall to the collection vessel.

27 Claims, 3 Drawing Figures

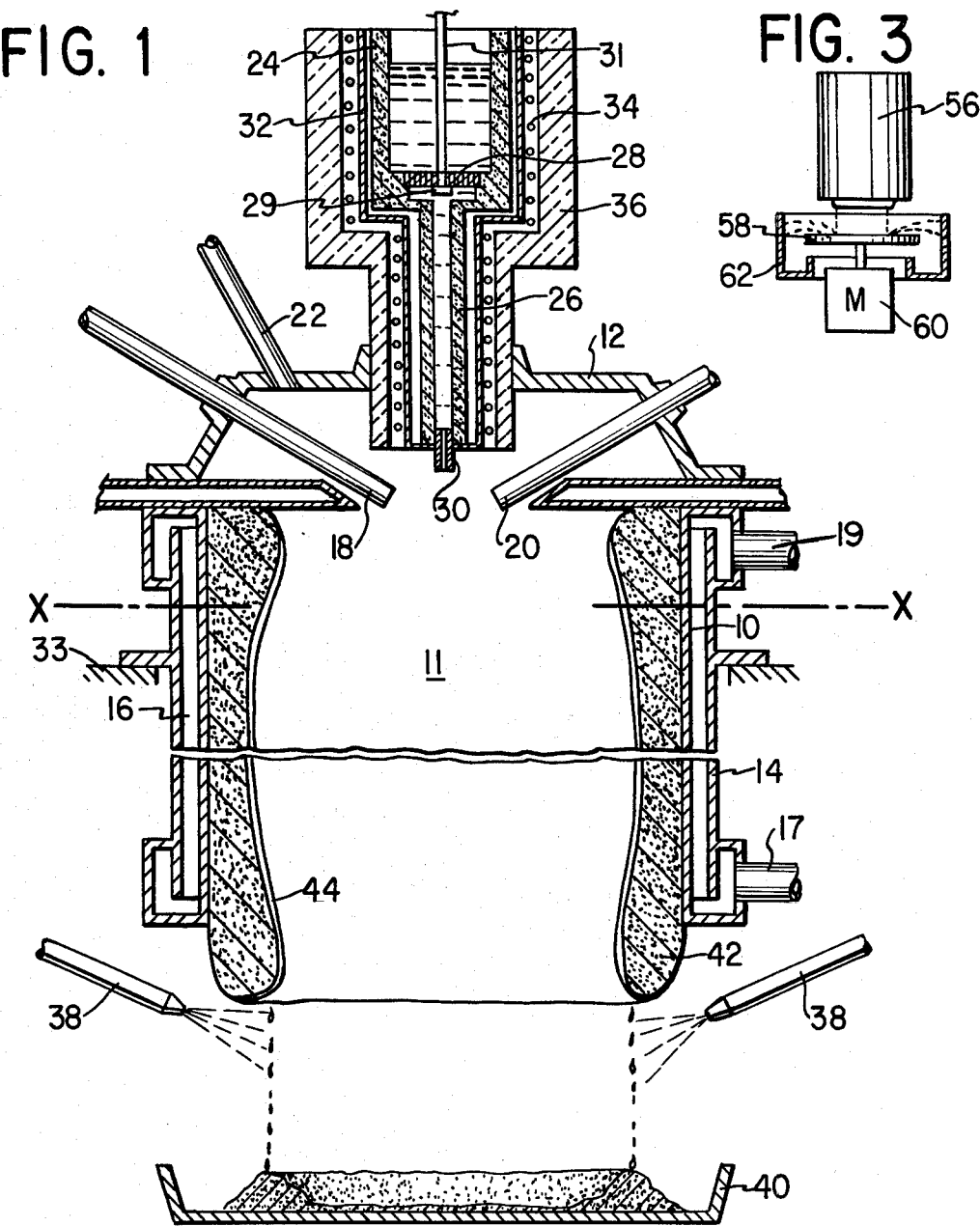
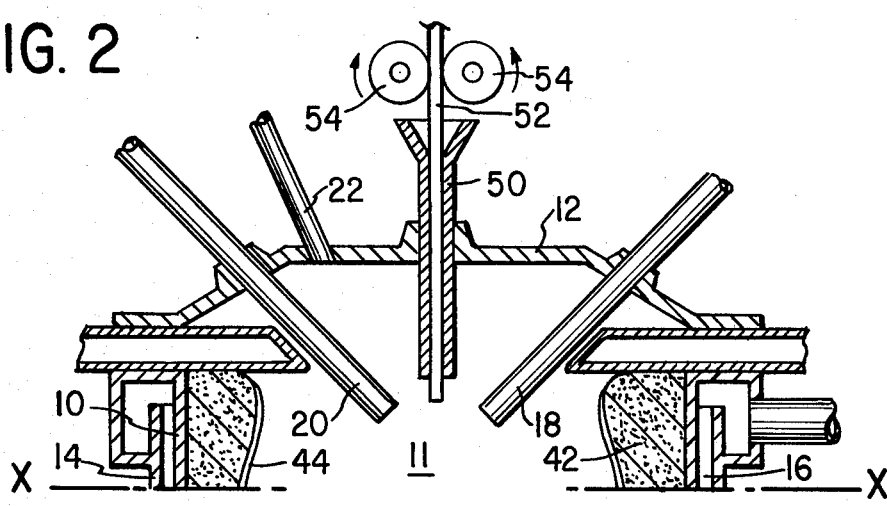

METHOD FOR PRODUCTION OF ALUMINUM OXIDE

This is a continuation of my copending application Ser. No. 963,338, filed Nov. 24, 1978 for Method & Apparatus for the Production of Aluminum Oxide and now abandoned.

BACKGROUND OF THE INVENTION

1. Field of the Invention

The present invention relates to the production of aluminum oxide of very high purity, of the order of 99.999% pure or higher. One use for this material is as feed material to molten baths of aluminum oxide from which large single crystals of aluminum oxide may be grown. These crystals may be cut into slices for use as substrates for the support of circuit elements in the manufacture of integrated circuits in the electronic arts. Antifriction bearings may also be made from such crystals.

2. Description of the Prior Art

In my prior U.S. Pat. Nos. 3,085,871, 2 and 3 I have disclosed a method and apparatus for producing refractory metals such as titanium by reduction, with the aid of a reducing agent such as liquid sodium, of liquid or gaseous halides of those metals in an atmosphere maintained at supra-atmospheric pressure and rich in gas of the halide of the metal to be reduced, rich in gas of the reducing agent, rich in an inert gas, or rich in a combination of such gases. The present invention, in contrast, provides a process of oxidation instead of reduction and is carried out at or near atmospheric pressure, and provides apparatus with which that process may be carried out and the oxide product thereof satisfactorily recovered.

SUMMARY OF THE INVENTION

According to the present invention, high purity aluminum, either molten or solid, e.g. in the form of wire or strip or powder, and high purity oxygen are introduced into a reaction chamber which may take the form of a vertically oriented cylindrical vessel closed at the top and open at the bottom, and having chilled walls. Oxygen is provided in stoichiometrically excess quantity and the pressure within the vessel is desirably maintained slightly above atmospheric by the supply of excess oxygen thereto. With the optional supply of supplementary heat to the chamber by oxidation therein of a fuel such as hydrogen, acetylene or propane, oxidation of the aluminum to aluminum oxide is effected in a flame type reaction within the chamber. The resulting aluminum oxide, gaseous or liquid, settles in part on the walls of the vessel and builds up, to an equilibrium thickness, a layer of aluminum oxide in the solid phase overlain on its inner surface with a film of molten aluminum oxide which flows downwardly over the layer and out the bottom of the vessel to a collection vessel below.

BRIEF DESCRIPTION OF THE DRAWING

The invention will now be further described in terms of a number of presently preferred modes of practice of the process of the invention and in terms of a number of presently preferred embodiments of the apparatus of the invention and by reference to the accompanying drawing in which:

FIG. 1 is a vertical axial sectional view of one form of apparatus according to the invention for carrying out the process of the invention;

FIG. 2 is a vertical axial sectional view of apparatus which, when combined with the apparatus shown below the dashed line X—X in FIG. 1, makes up another form of apparatus according to the invention: and FIG. 3 is a diagrammatic illustration of another form of apparatus according to the invention.

DESCRIPTION OF PREFERRED EMBODIMENTS

Referring to FIG. 1, reference character 10 identifies a cylinder of a material which is a good heat conductor such as copper. The cylinder 10, together with a dome or cap 12 which may be of the same or of a different material, constitutes a partially closed vessel which provides partial enclosure to a space 11 within which aluminum oxide of high purity is formed in accordance with the invention. An outer cylinder 14 and sheet metal elements continuous therewith, which may be conventional in nature, define a coolant jacket space 16 for the cylinder 10, to facilitate removal of heat from the outer surface of the latter. The cylinder 10 and its jacket 14 are shown broken away in the drawing to indicate that in general the length-to-diameter ratio of the cylinder 10 will be larger than would otherwise be suggested by the drawing.

The dome 12 is pierced at suitable locations to permit delivery therethrough of aluminum and of oxygen and, in the preferred embodiment illustrated, of a mixture of oxygen and hydrogen or of oxygen and acetylene or of oxygen and propane or other combination of oxygen and combustible gas. More particularly, in the preferred embodiment illustrated and being described, nozzles 18 and 20 pass through the dome 12 for the delivery of a mixture of oxygen and hydrogen and of oxygen to the space 11, which constitutes a reaction chamber. In each case, the oxygen is of high purity. Advantageously there may be for example three nozzles 18 and three nozzles or lances 20, all alternately and equiangularly disposed about the axis of cylinder 10. A further inlet 22 through the dome 12 is supplied also with high purity oxygen, to insure a slight supraatmospheric pressure beneath the dome 12 and to insure that the atmosphere there will be oxidizing, with an excess of oxygen over that stoichiometrically required for combination with the aluminum which is to be converted to aluminum oxide (and also over that required for combustion of any hydrogen, acetylene or other fuel supplied at the nozzles 18).

The nozzles 18 and 20, sometimes hereinafter referred to as torches and lances respectively, may be conventional in construction. They are designed each to deliver to the space 11 as a high velocity stream the gas or gases with which they are fed from sources not shown in the drawing. These sources may include conventional elements of structure, known in the arts of gas welding and metal cutting, for mixing gases and regulating the delivery velocity and pressure thereof.

In the embodiment of FIG. 1, aluminum is supplied to the interior of cylinder 10 in molten form. A crucible 24, for example of graphite, is provided to contain molten aluminum (or to melt aluminum) of high purity, supplied from a suitable source and replenished as necessary. A drain conduit 26, which may also be of graphite, connects to the lower end of crucible 24 through a finely perforated disc-shaped filter 28. At its lower end beneath the dome 12, the conduit 26 terminates in a suitably calibrated nozzle 30, which may be of aluminum oxide. To control the rate of flow of aluminum from the crucible 24, a graphite plug 29 is movably seated in the upper end of conduit 26, under control of an upwardly extending operating rod 31 of refractory material attached to the plug.

The crucible 24 and conduit 26 are protected on the exterior from oxidation by a metallic shroud 32 which may be of a stainless steel or nickel and cobalt alloy. Heat to melt aluminum in the crucible 24, or to maintain it there in molten condition and to permit it to flow through conduit 26, may be supplied by an electric resistance winding, or alternatively by an electric induction heating coil, indicated at 34. A thermally insulating jacket is indicated at 36.

The crucible 24 and conduit 26 may be made of another suitable refractory substance, such as aluminum oxide, which is non-contaminating to the molten aluminum.

An annular array of inwardly directed burner nozzles 38 is disposed a short distance beneath the cylinder 10 and coaxially thereof, for the delivery of oxy-hydrogen, oxy-acetylene or other combustible gas mixture which upon burning forms an annular region of temperature high enough (above 2070° C.) to prevent the solidification of aluminum oxide therein. The mixture of gases for the nozzles 38, as for the nozzles 18, is formed upstream of those nozzles by apparatus which may be conventional and which is known in the art of oxy-hydrogen and acetylene welding and cutting.

The structure thus far described, including the burners 38, is supported by suitable means, diagrammatically indicated as abutments 33, with the axis of cylinder 10 vertical and with the dome 12 at the upper end thereof. A collection vessel such as a stainless steel basin 40 is positioned beneath that structure to collect in solidified form the aluminum oxide product. The vessel 40 may be spaced a substantial distance below the ring of burners 38 in order to permit drops of molten aluminum oxide falling from the cylinder 10 (and more particularly from an annular layer or mass of solidified aluminum oxide 42 built up on the inside surface of that cylinder and extending below it) to solidify before reaching the vessel 40.

In steady state operation of the apparatus of FIG. 1, the interior surface of the cylinder 10 carries an annular layer 42 of solidified aluminum oxide. This layer may be regarded as an autocrucible surrounding a reaction zone (part of the space 11) in which the formation of aluminum oxide takes place. As the oxidation of aluminum proceeds, the newly formed aluminum oxide is deposited on the inner surface of the layer 42, where it appears as a downwardly flowing film 44. The layer 42 extends below the lower limit of the cylinder 10, either as a circumferentially continuous curtain-like mass or as a number of downwardly extending stalactites, the mass or the stalactites being in either event limited in their downward extension by the flames from the burners 38.

To start the oxidation of aluminum, heat may be supplied to the interior of cylinder 10 by means of the torches 18. A spark ignition device of the kind used to ignite oxy-acetylene welding torches may be provided, depending from the cap 12 and located adjacent the inner end of one of those torches. Supply of heat from the combustion of fuel at the torches 18 may be reduced or terminated after the oxidation of aluminum is under way, and particularly after the layer 42 of aluminum oxide has been built up on the inner surface of the cylinder. Once the layer 42 has been built up, it may be left in place even when the apparatus is shut down, so as to be available when operation is restarted. When the apparatus is first started, before build-up of the layer 42 has occurred, it may be necessary to limit the rate of supply of aluminum in order to prevent destruction of the cylinder from excessive heat. Oxygen is however always supplied at a rate at least corresponding stoichiometrically to the rate of supply of aluminum and of any other combustible. Once the layer 42 has been built up, the rate of supply of aluminum and oxygen may be increased, with consequent increase in the rate of evolution of heat in the space 11, so as to prevent further growth in the thickness of the layer 42, and in particular to prevent its closing off the lower end of the cylinder 10.

For any given apparatus as illustrated in FIG. 1, and for any given rate of coolant flow through the jacket 16, there will be a range of rates of supply of the reactants aluminum and oxygen over all of which a generally stable equilibrium of heat evolution and withdrawal will exist. For a given rate of feed of aluminum to the reaction zone, this equilibrium will occur at that thickness of the layer 42 for which heat is abstracted from the apparatus at the same rate as that at which it is evolved therein. Incipient further growth in thickness of the solid layer 42 will be checked by the consequent decline in heat flow to the cylinder 10, by the consequent incipient rise in temperature in the space 11 inside that layer and beneath the cap 12, and by the consequent increased tendency for newly formed aluminum oxide to flow as a liquid down and out of the cylinder in the liquid film 44. Conversely, incipient decline in the thickness of layer 42 will increase the rate of heat loss from the reaction zone to the coolant, so that a self-correcting increase in build-up of solid aluminum oxide will occur. The equilibrium thickness for the layer 42 will vary inversely with the rate of feed of aluminum to the apparatus.

An example of what is presently believed to be preferred practice of the invention will now be given.

EXAMPLE

In one design of apparatus according to the invention the cylinder 10 has an inside diameter of 10 cm. and a length of 60 cm. The external surface of the cylinder is provided with closely spaced longitudinal grooves in number and depth sufficient to add, to the area in contact with the coolant, an area twice as large as the exterior surface of the cylinder without those grooves. The nozzle 30, made of high density aluminum oxide, has a bore of 2 mm. diameter. The inwardly directed burners 38 are disposed approximately 8 cm. below the lower end of the cylinder 10 and the collection vessel 40 is approximately 8 meters below those burners. The torches 18 are positioned to cause the flames issuing therefrom to intersect at a point approximately 2 cm. below the nozzle 30, and the oxygen lances 20 are positioned to cause their streams of oxygen to intersect about 3 cm. below that nozzle. Accordingly, when the molten aluminum is allowed to flow out from the nozzle 30, the gas streams and the flames from the torches 18 and the oxygen streams from the lances 20 will impinge upon the falling stream of aluminum, atomizing the aluminum into fine droplets; thereby promoting its rapid oxidation. The axes of the torches and lances 18 and 20 are inclined at approximately 45° to the axis of cylinder 10.

Coolant water, entering the jacket 16 at entrance 17 and at room temperature, flows through the jacket at a rate of 3 liters per second and at a linear velocity of about 3 meters per second, the flow cross section of the jacket space being approximately 10 cm² and leaves via exit 19.

At the start of the operation the cylinder 10 is without any aluminum oxide layer 42 on its inner surface. The graphite crucible 24 is filled initially with approximately 40 kg. of molten aluminum and the heating coil 34 is energized to keep the aluminum molten. Mixing, pressure regulating, and control valve means not shown, associated with the torches 18 are adjusted to cause those torches to deliver each approximately 0.05 grams of hydrogen per second and 0.5 grams of oxygen per second. The lances 20 are adjusted, by operation of similar means associated therewith and not shown, to supply each 1.6 grams of oxygen per second. The conduit 22 leads also to valving and pressure regulating apparatus, not shown, which may likewise be conventional, and this is adjusted to provide, during operation, a flow of oxygen sufficient to maintain a very slight supra-atmospheric pressure in the space 11. A flow rate of approximately one gram of oxygen per second may be sufficient for this purpose.

Before aluminum is admitted to the reaction chamber, i.e. to the interior of cylinder 10, the flow of oxygen and hydrogen is established and ignition is provided to establish a high temperature in the interior of the cylinder. The plug 29 is then lifted from its seat at the upper end of conduit 26 to permit aluminum to flow into the reaction chamber, at a rate of approximately 5.4 grams per second. As soon as aluminum starts to flow from nozzle 30, it is heated to ignition temperature by the oxyhydrogen flames from torches 18 and is atomized by the gases from those flames and by the streams of oxygen flowing from the lances 20. The aluminum is oxidized, at a temperature of about 3000° C., to aluminum oxide in both gaseous and liquid phase, and a layer 42 of solidified aluminum oxide quickly builds up on the inside wall of the cylinder. After ignition of the aluminum is obtained, the supply of fuel (hydrogen or other) to the torches 18 may be reduced or cut off. The layer 42 builds in thickness, with a film 44 of liquid aluminum oxide on top thereof, until at each point on the inside wall of the cylinder there is achieved an equilibrium between the heat flux arriving from the oxidation reaction and the heat flux abstracted by the coolant from the exterior surface of the cylinder. At the height in the cylinder where the oxidation reaction is most intense, a short distance below the nozzle 30, the outward thermal flux may be of the order of 16 calories per square centimeter per second, and here the equilibrium thickness of the solid aluminum oxide layer 42 will be of the order of 0.3 to 0.5 cm. In contrast, at lower regions along the height of the cylinder, the thermal flux may be of the order of 8 calories per square centimeter per second, and here, under the coolant flow conditions specified, the equilibrium thickness of the layer 42 will be of the order of 1.0 to 1.5 cm.

The continuously and newly formed aluminum oxide flows in liquid form as a film 44 downwardly over the layer 42 and falls from the lower end of that layer as drops or spheres which solidify by the time they reach the vessel 40. Approximately 36 kg. of aluminum oxide are produced per hour.

In accordance with the invention, the aluminum can be supplied in either solid or liquid phase to the reaction zone. When supplied in the solid phase it can be either in the form of a wire or strip, for example, or in the form of a more or less finely divided powder. FIG. 2 illustrates apparatus according to the invention, which, when combined with that portion of the apparatus of FIG. 1 below the line X—X in the latter figure, is suitable for practice of the invention. The apparatus of FIG. 2 may be the same as that shown above the line X—X in FIG. 1 (and which latter apparatus it replaces to form the second embodiment of apparatus according to the invention now being described) except that for the crucible 24 and related structure of FIG. 1 for delivery of molten aluminum to the reaction zone there is substituted means for delivery to the reaction zone of a wire or strip of high purity aluminum. Thus in FIG. 2 the thermal insulating jacket 36 and the elements within it are replaced by a conduit 50 of refractory material which passes through the dome 12 along the axis of cylinder 10 to deliver to the interior of the latter a high purity aluminum wire 52. Feed rolls 54, which may be driven at adjustable speed by conventional apparatus not shown, permit delivery of the wire at any desired rate.

It may be desired to obtain solidified aluminum oxide free of entrapped air. According to another aspect of the invention, illustrated in FIG. 3, this may be done by allowing the molten aluminum oxide to fall, while still in the liquid phase, onto a cool metal surface, where it freezes and from which it can be removed by scraping or by the imposition of an acceleration on that surface. An embodiment of the apparatus of the invention suitable to this purpose is illustrated in FIG. 3. In that figure, the rectangle 56 represents diagrammatically the apparatus of FIG. 1 (or that of FIG. 2 together with that portion of the apparatus of FIG. 1 below the line X—X in FIG. 1) except for the collection vessel 40. In place of that vessel there is provided a metallic plate 58, circular in outline, supported for rotation in a horizontal plane and about a vertical axis by means of a motor 60. If desired or necessary, the plate may contain passages for the circulation of a coolant therethrough, connecting through sliding seals with stationary coaxial inlet and outlet conduits inside the motor shaft. An annular vessel 62 surrounds the plate 58 to receive solidified aluminum oxide splatter thrown off the plate by centrifugal force.

While the invention has been described hereinabove in terms of a number of presently preferred modes of practice of the method thereof and in terms of a number of presently preferred embodiments of the apparatus thereof, the invention itself is not limited thereto, but rather comprehends all modifications of and departures from those modes and embodiments properly falling within the spirit and scope of the annexed claims.

I claim:

1. A method of producing aluminum oxide which comprises:
    (a) introducing aluminum at a controlled rate into a reaction chamber at least partially bounded by a downwardly extending side wall of solid aluminum oxide,
    (b) introducing oxygen into said chamber at a controlled rate sufficient to maintain in at least part of said chamber an atmosphere with a stoichiometric excess of oxygen with respect to oxidizable matter there, (c) supplying heat to said chamber sufficient to initiate a flame-type reaction therein between said aluminum and oxygen wherein aluminum is converted to aluminum oxide, (d) cooling at least a portion of the exterior surface of said wall to collect aluminum oxide formed in said flame-type reaction upon the inner surface of said wall as a downwardly flowing film of molten aluminum oxide, and (e) recovering said downwardly flowing aluminum oxide.

2. A method according to claim 1 wherein said recovery step comprises receiving said downwardly flowing aluminum oxide upon a chilled moving surface.

3. A method according to claim 1 including the further step of supplying heat to a space below said wall through which said downwardly flowing aluminum oxide falls to maintain said space at a temperature above the melting point of aluminum oxide.

4. A method according to claim 3 wherein said further step of supplying heat comprises delivering oxygen and a combustible gas to said space.

5. A method according to claim 1 including the further step of supplying a combustible gas into said chamber.

6. A method according to claim 1 wherein said aluminum is introduced as a molten stream.

7. A method according to claim 1 wherein said oxygen is introduced at least in part as a stream impinging upon said molten stream.

8. A method according to claim 1 wherein said aluminum is introduced as a wire.

9. A method according to claim 8 wherein said oxygen is introduced at least in part as a stream impinging upon said wire.

10. A method according to claim 1 wherein said aluminum is introduced as a powder.

11. A method according to claim 10 wherein said oxygen is introduced at least in part as a stream impinging upon said powder.

12. A method according to claim 1 wherein said side wall is substantially cylindrical and is substantially closed at the top.

13. A process according to claim 1 wherein said wall is supported on and constitutes a lining to a metallic cylinder.

14. A process according to claim 1 wherein said aluminum and oxygen are introduced into the upper part of said chamber and wherein said aluminum oxide is recovered through an opening in the lower part of said chamber.

15. A method of producing aluminum oxide which comprises:

(a) introducing aluminum at a controlled rate into a reaction chamber at least partially bounded by a downwardly extending side wall, (b) introducing oxygen into said chamber at a controlled rate sufficient to maintain in at least part of said chamber an atmosphere with a stoichiometric excess of oxygen with respect to oxidizable matter there, (c) supplying heat to said chamber sufficient to initiate a flame-type reaction therein between said aluminum and oxygen wherein said aluminum is converted to aluminum oxide, (d) cooling at least a portion of the exterior surface of said wall to collect aluminum oxide formed in said flame-type reaction first as a solid layer upon the inner surface of said wall and thereafter as a downwardly flowing film of molten aluminum oxide on the inside of said layer, and (e) recovering said molten aluminum oxide.

16. A method according to claim 15 wherein said recovery step comprises receiving said aluminum oxide upon a chilled moving surface.

17. A method according to claim 15 including the further step of supplying heat to a space below said wall through which said aluminum oxide falls to maintain said space at a temperature above the melting point of aluminum oxide.

18. A method according to claim 17 wherein said further step of supplying heat comprises delivering oxygen and a combustible gas to said space.

19. A method according to claim 15 including the further step of supplying a combustible gas into said chamber.

20. A method according to claim 15 wherein said aluminum is introduced as a molten stream.

21. A method according to claim 20 wherein said oxygen is introduced at least in part as a stream impinging upon said molten stream.

22. A method according to claim 15 wherein said aluminum is introduced as a wire.

23. A method according to claim 22 wherein said oxygen is introduced at least in part as a stream impinging upon said wire.

24. A method according to claim 15 wherein said aluminum is introduced as a powder.

25. A method according to claim 24 wherein said oxygen is introduced at least in part as a stream impinging upon said powder.

26. A method according to claim 15 wherein said side wall is substantially cylindrical and is substantially closed at the top.

27. A method according to claim 15 wherein said aluminum and oxygen are introduced into the upper portion of said chamber and wherein said molten aluminum oxide is recovered through an opening in the lower part of said chamber.

* * * * *

UNITED STATES PATENT AND TRADEMARK OFFICE
CERTIFICATE OF CORRECTION

PATENT NO. : 4291011

DATED : September 22, 1981

INVENTOR(S) : Kenneth F. Griffiths

It is certified that error appears in the above–identified patent and that said Letters Patent are hereby corrected as shown below:

Claim 7, column 7, line 30, "1" should be -- 6 --.

Signed and Sealed this

Twenty-fourth Day of November 1981

[SEAL]

Attest:

Attesting Officer

GERALD J. MOSSINGHOFF

Commissioner of Patents and Trademarks